United States Patent
Onodi et al.

(10) Patent No.: US 10,480,777 B2
(45) Date of Patent: Nov. 19, 2019

(54) HANDRAIL INSTALLATION WITH EMERGENCY LIGHTING

(71) Applicant: Woertz Engineering AG, Muttenz (CH)

(72) Inventors: Tamas Onodi, Thalwil (CH); Andreas Dreier, Nunningen (CH); Yannick Buser, F-Magstatt-le-Haut (FR)

(73) Assignee: Woertz Engineering AG, Muttenz (CH)

( * ) Notice: Subject to any disclaimer, the term of this patent is extended or adjusted under 35 U.S.C. 154(b) by 0 days.

(21) Appl. No.: 16/125,873

(22) Filed: Sep. 10, 2018

(65) Prior Publication Data

US 2019/0078771 A1      Mar. 14, 2019

(30) Foreign Application Priority Data

Sep. 11, 2017    (EP) ..................................... 17190287

(51) Int. Cl.
*F21V 33/00*      (2006.01)
*H01B 7/08*       (2006.01)
(Continued)

(52) U.S. Cl.
CPC .......... *F21V 33/006* (2013.01); *E04F 11/181* (2013.01); *F21V 23/001* (2013.01);
(Continued)

(58) Field of Classification Search
CPC ...... F21V 33/006; F21V 23/001; F21V 25/12; F21V 99/00; F21V 15/00; F21V 15/01;
(Continued)

(56) References Cited

U.S. PATENT DOCUMENTS

| 3,569,689 A | 3/1971 | Nestrock |
| 4,161,769 A | 7/1979 | Elliott |

(Continued)

FOREIGN PATENT DOCUMENTS

| EP | 2927912 A1 | 10/2015 |
| GB | 2426259 A | 11/2006 |

OTHER PUBLICATIONS

LED—Lighting & Electronic Design: "Hand Rail Lite Series," Dec. 31, 2009; URL: http://ledlinc.com/aisleStepPDF/HandRailSeries.PDF.

(Continued)

*Primary Examiner* — Bao Q Truong
(74) *Attorney, Agent, or Firm* — Frost Brown Todd LLC (57) ABSTRACT

A handrail installation with emergency lighting for tunnels, comprising a handrail, a closed cable duct, at least one flat cable that is installed along the closed cable duct, and multiple branching boxes for contacting the flat cable without stripping of insulation. The branching boxes contact the flat cable within the closed cable duct. The handrail and the cable duct rest on support surfaces, which are different from one another, on the top side of multiple support members, and the handrail is provided separately from the closed cable duct and the support members, the cable duct is provided separately from the support members, and the handrail is situated above the closed cable duct. The emergency lighting includes multiple lamps situated in succession, which are placed at the branching boxes and are supplied with power by same. The lamps are passed through superposed installation openings in the floor of the cable duct, in the direction of the tunnel floor, so that the lamps radiate into an area below the closed cable duct. The closed cable duct and the support members are made of fireproof metal, and the flat cable as well as the branching boxes have a fireproof design.

15 Claims, 5 Drawing Sheets

(51) Int. Cl.
    *H02G 3/04*     (2006.01)
    *H01B 7/295*     (2006.01)
    *F21V 25/12*     (2006.01)
    *E04F 11/18*     (2006.01)
    *F21V 23/00*     (2015.01)
    *F21W 131/101*     (2006.01)
    *F21W 111/08*     (2006.01)

(52) U.S. Cl.
    CPC ............... F21V 25/12 (2013.01); H01B 7/08 (2013.01); H01B 7/295 (2013.01); H02G 3/0418 (2013.01); H02G 3/0462 (2013.01); *E04F 2011/1872* (2013.01); *F21W 2111/08* (2013.01); *F21W 2131/101* (2013.01)

(58) Field of Classification Search
    CPC .......... F21V 21/00; F21V 21/02; F21V 25/00; F21V 33/00; E04F 11/181; E04F 2011/1872; H01B 7/08; H01B 7/295; H02G 3/0418; H02G 3/0462; F21W 2111/08; F21W 2131/101
    See application file for complete search history.

(56) References Cited

U.S. PATENT DOCUMENTS

| 4,367,517 A | * | 1/1983 | Balzer | ................. | E04F 11/1804 |
| | | | | | 362/146 |
| 4,394,718 A | | 7/1983 | Balzer | | |
| 2008/0289294 A1 | * | 11/2008 | Harrison | ............. | E04F 11/1804 |
| | | | | | 52/832 |

OTHER PUBLICATIONS

Schoeb, Marcel, "Sicherheitsbeleuchtung in Tunnels," May 31, 2015; URL: https://www/elektrotechnik.ch/fileadmin/elektrotechnik.ch/documents/PDF/ET_5_2015_Gotthard.pdf.

* cited by examiner

Fig. 5

HANDRAIL INSTALLATION WITH EMERGENCY LIGHTING

FIELD OF THE INVENTION

The invention relates to a handrail installation with emergency lighting.

BACKGROUND OF THE INVENTION

The HRS LaneLED GFK handrail system from Gifas Electric has a handrail that is integrally molded with its cable duct, in which round cables extend in a rail on the bottom side of the portion that supports the handrail and supply an LED lane, fastened in this rail, with power.

BRIEF DESCRIPTION OF THE INVENTION

A first aspect of the invention relates to a handrail installation with emergency lighting for tunnels, including a handrail, a closed cable duct, a flat cable that is installed in the closed cable duct, and multiple branching boxes for contacting the flat cable without stripping of insulation. The branching boxes contact the flat cable within the closed cable duct. The handrail and the cable duct rest on support surfaces on the top side of multiple support members, which are different from one another, and the handrail is provided separately from the closed cable duct and the support members, and the cable duct is provided separately from the support members, wherein the handrail is situated above the closed cable duct. The emergency lighting includes multiple lamps situated in succession, which are placed at the branching boxes and are supplied with power by same. The lamps are passed through superposed installation openings in the floor of the cable duct, in the direction of the tunnel floor, so that the lamps radiate into an area below the closed cable duct. The handrail and the cable duct are horizontally guided along a tunnel wall by the support members. The closed cable duct and the support members are made of fireproof metal, and the flat cable as well as the branching boxes have a fireproof design.

Another aspect relates to an installation kit for a handrail installation with emergency lighting, wherein the installation kit includes a handrail with emergency lighting, a closed cable duct, a flat cable for installation in the closed cable duct in the longitudinal direction thereof, and multiple branching boxes for contacting the flat cable without stripping of insulation, wherein the cable duct is also provided for accommodating the branching boxes, and includes discrete support members having support surfaces, that are different from one another, for the handrail and the cable duct. The handrail forms a component that is separate from the cable duct and is designed for arrangement above the closed cable duct. The installation kit for a handrail installation with emergency lighting also includes multiple lamps for arrangement in succession in the longitudinal direction of the handrail installation with emergency lighting, wherein openings for passing through the lamps for radiation away from the cable duct floor are provided in the floor of the cable duct, and wherein the closed cable duct and the support members are made of metal.

GENERAL DESCRIPTION, ALSO WITH REGARD TO OPTIONAL EMBODIMENTS OF THE INVENTION

One aspect of the invention relates to a handrail installation with emergency lighting for tunnels. Handrail installations in tunnels, such as railway tunnels, are designed for guiding people out of the tunnel, or at least to the next safety tunnel, in the event of an accident in a tunnel. This guiding is necessary, since after a train accident, for example, although passengers may be able to follow the course of the train in the tunnel, they may lose their orientation at the latest after they have reached the end of the train. Due to the emergency lighting, the route along which the passengers are guided is illuminated, which allows them to travel safely without, for example, walking over debris that is lying around after an accident.

The handrail installation with emergency lighting includes a handrail, a closed cable duct, and at least one flat cable that is installed along the closed cable duct. The use of a flat cable, i.e., a cable with cable cores extending in parallel, in safety installations such as the handrail installation with emergency lighting described here increases the fail-safe operation capability of the cable. Namely, the twisted-together cores of round cables may be lightly pressed together by falling parts when cable insulation has already melted off, resulting in a short circuit. For flat cables having a fireproof design, the parallel cores are packed into fireproof, insulating cable sheathing that ceramifies at temperatures typical for fire, as the result of which they do not contact one another, even at elevated temperatures.

The handrail installation with emergency lighting also includes multiple branching boxes for contacting the at least one flat cable without stripping of insulation, wherein the branching boxes contact the at least one flat cable within the closed cable duct. "Without stripping of insulation" is understood to mean that the cable does not have to be cut open in order to establish electrical contact; instead, contact pins or contact blades penetrate into the cable sheathing up to the cable cores and contact same, without having to remove the insulation layer of the cable cores. The branching boxes contact the flat cable directly in the cable duct, which must thus be designed to be wider than the flat cable itself in order to grasp the branching boxes and the flat cable that is contacted by same.

The emergency lighting includes multiple lamps, situated in succession, that are placed on the branching boxes and supplied with power by same. The lamps are passed through in the direction of the tunnel floor through superimposed installation openings in the floor of the cable duct, so that they radiate into an area below the closed cable duct. Since the lamps are placed directly in the cable duct and directly on the branching boxes, it is not necessary to supply the lamps with power over fairly long branch lines or the like. Rather, they may be supplied with power indirectly via the branching boxes through short spur lines, or via direct connections that may be present at the branching boxes.

In addition, the connecting lines from the branching boxes to the lamps are stowed within the cable duct, which results in a very compact arrangement and facilitates the installation of the lamps. The lamps need only be engaged in installation openings in the floor of the cable duct and connected to the particular closest branching box. The lamps are passed through installation openings in the floor of the cable duct in the direction of the tunnel floor. This also facilitates the positioning of the lamps in succession at certain intervals (for example, one meter between the lamps, two meters between the lamps, etc.), since they need only be installed in mounting holes that are already present.

Even if the lamps have to be inserted through installation openings in the cable duct in order to be connected in the cable duct and at the same time to illuminate the space below the cable duct, the cable duct is always closed during operation. Namely, the lamps that are inserted through the installation openings completely close these openings in the passed-through state of the lamps.

The use of individual lamps situated in succession, in comparison to the use of light chains that are mounted as a whole, increases the replaceability, since individual defective lamps may be easily replaced.

The handrail and the cable duct rest on support surfaces on the top side of multiple support members, wherein the handrail is provided separately from the closed cable duct or the support members, the cable duct is provided separately from the support members, and the handrail is situated above the closed cable duct.

In order to fasten the handrail and the cable duct to the tunnel wall at a height so that passengers can easily grip the handrail, the support members are fastened to the tunnel wall at a height such that the desired height of the handrail is achieved.

In principle, the handrail installation with emergency lighting includes multiple separate single components:

These components are, firstly, the support members that are fastened to the wall, and that bear the closed cable duct at a first height on the support surfaces that are provided on the support members, and that have second support surfaces, which bear the handrail at a second height, for example above the side walls of the support members that adjoin the support surfaces for the cable duct.

The handrail is likewise designed as a separate element, for example as a retaining tube that is guided through the support surface along the tunnel wall. The handrail may be made of glass fiber-reinforced plastic, for example. The handrail is placed far enough above the cable duct, for example, that a hand may be placed around the handrail without touching the cable duct situated further below. The cable duct is fixed, for example, to the support surfaces for the cable duct of the support members, in particular between the side wall of the support members and the tunnel wall. This ensures that the cable duct follows the course of the tunnel wall.

The handrail and the cable duct are horizontally guided along a tunnel wall by the discrete support members. The closed cable duct and the support members are made of metal. This increases the fire safety of the overall handrail installation with emergency lighting. As a result of the metal closed cable duct, it is very difficult for a fire to spread into the interior of the cable duct and to the flat cable or the branching boxes.

In some embodiments, the flat cable as well as the branching boxes have a fireproof design. However, even if temperatures typical for fire (above 150° C.) act on these components, they are designed so that no short circuit occurs inside the components or via the metal cable duct itself.

For this purpose, electrically conductive parts in the branching boxes are typically kept insulated from one another by fireproof ceramic. For the flat cable, the same effect is achieved, for example, by an above-mentioned fireproof cable sheathing, or by the cable cores together with the ceramifying insulation layer resting on a fireproof mica tape that lies between the cable cores and the metallic cable duct, even if the outer cable casing melts off.

In some embodiments, the branching boxes are protected from penetration of dust or water by a plastic housing and seals on the openings. Even when the cable duct is closed, water (running water, spray water) or dust could penetrate into the cable duct, for example at an opening that matches a cover for the cable duct. To prevent a short circuit in the area of the branching box due to penetration of water in the vicinity of the branching boxes, the branching boxes are provided, for example, with water-tight plastic housings or with seals in the area of their openings. Penetration protection up to class IP68 may be achieved, depending on the plastic or the seals used (rubber seal, labyrinth seal).

In some embodiments, the lamps, individually or in groups, are protected against overcurrent and/or temperatures typical for fire. As a result of this protection, a short circuit that occurs on one lamp of the emergency lighting cannot flash over to the entire electrical installation together with the flat cables as a through line. The short circuit is detected directly via the overcurrent which it triggers, and the overcurrent fuse separates the electrical connection between the flat cable and the fuse-protected lamp(s). For a fuse that triggers at temperatures typical for fire, the lamps may possibly be separated even before a short circuit is actually present in the lamp(s), but which is virtually imminent due to the temperature that is typical for fire.

It is possible to provide either only overcurrent fuses, or only fuses that are triggerable by temperatures typical for fire, as well as a combination of both types of fuses. The fuse may, for example, be placed directly in the branching box, or placed electrically between the branching box and the lamp(s). One fuse may be provided for one lamp, or one fuse may be provided for multiple (for example, 10, 20, or 30) lamps; when the fuse is placed within the branching boxes, a branching box for each lamp or a branching box for corresponding multiple lamps is then accordingly provided.

In some embodiments, the lamps are inserted into a lamp housing and include a lighting means, wherein the lamp housing is made of a water-tight material and the lamp is protected from penetration of dust or water. The lamp housing is thus closed off.

The lamps are equipped, for example, with a lamp housing that is suspended in the cable duct, for example directly next to a branching box, and in a train is electrically connected to the branching box. This allows rapid installation of the lamps, and provides a compact arrangement in which the lamps do not first have to be fastened outside the cable duct, and only then connected to a through line in the cable duct.

The electrical terminals of the lamp are typically situated on the lamp housing within the cable duct, and the lamp, held in the lamp housing, is inserted through mounting holes in the floor of the cable duct. At the end of the lamp housing that is situated in the cable duct, a retaining device (a suspension, for example) for the lamp may be provided which holds the lamp in a specified position. The lamps may be connected directly to the branching box, or may be connected to same via spur lines.

The lamp housing and the lamps are made of water-tight plastic, for example, and are equipped with multiple seals, for example on the seat of the lighting means or in the area of the lens(es), in order to achieve overall seal-tightness against dust and water up to class IP68. Functional failures of the lamps due to penetration of water or dust are prevented by the overall seal-tightness of the lamp housing and of the lamps. In addition, the lamps may have their own cooling to further increase fail-safe operation. The cooling lessens the heating of the lamp, in particular the lighting means of the lamp (LEDs, for example), during a fire, for example, and thus increases the functional life of the lamp at temperatures typical for fire, or also at standard temperature.

In some embodiments, the lighting means are oriented either obliquely downwardly, or vertically downwardly with the light emitted by the lighting means being deflected in the obliquely downward direction by a deflection device.

In this embodiment, the area beneath the handrail or the cable duct obliquely below the cable duct or the handrail is illuminated. In this embodiment, the light cone of the lamps typically encloses an angle between the cable duct and the tunnel wall on which the handrail installation with emergency lighting is mounted. The angle is typically selected so that the lamps radiate obliquely downwardly in the direction of the tunnel center. The floor next to and below the handrail is thus illuminated along the handrail, thereby facilitating escape for passengers along the handrail. Obstructions in the area of the escape route are thus well visible along the handrail.

As a first option, the light cone in the area obliquely below the handrail or cable duct may be generated by mounting the lamps obliquely in the cable duct and guiding them through an installation opening in the cable duct in such a way that the lighting means are oriented obliquely downwardly into this area.

As a second option, the lamps are mounted vertically in the cable duct and also guided perpendicularly through the installation openings in the floor of the cable duct, and the lighting means are thus also oriented vertically downwardly. However, a deflection device, a lens, for example, is provided downstream from the lighting means, and deflects the light cone obliquely into the area below the handrail or the cable duct.

In some embodiments, the lamps are designed in such a way that they linearly illuminate the area below the cable duct and handrail. In this embodiment, no light cone extends in the area of the handrail; rather, a line drawn with light is produced on the floor next to the handrail, and in addition to the handrail is used as an extra orientation aid for the escaping passengers. The linear illumination may be achieved either via LEDs arranged in a line and having a narrow illumination cone as lighting means, or some other lighting means may be used whose illumination cone, which was originally wider, is focused by a lens system to provide linear illumination.

In some embodiments, the distance between two lamps of the emergency lighting is between 0.8 and 2 meters. Such a distance ensures that persons who are following the lights along the handrail installation always see multiple lights in succession, which likewise facilitates orientation since it makes the contour of the upcoming route recognizable.

In some embodiments, the support member and the cable duct are made of solid V2A or V4A stainless steel. This selection of material is intended to ensure resistance of the structure to heat and fire, in particular up to temperatures of 900° C. With a support structure and a cable duct made of V2A or V4A stainless steel, it is also possible to attain functional integrity (i.e., retention of functionality of the entire handrail installation with emergency lighting for at least 30 minutes), or at least functionality for several minutes in the event of a severe fire.

The use of such a heat- and fire-resistant material prevents the flat cable that is laid within the cable duct from becoming exposed due to bending or melting of the cable duct, and prevents the entire handrail installation from simply falling off the tunnel wall due to the reduced bearing capacity of the support member caused by heat.

In this context, V2A stainless steel refers to a chromium-nickel steel containing at least 13% chromium. V2A steel is currently listed under material number 1.4301. In this context, V4A steel refers to a chromium-nickel steel with a molybdenum additive, which is currently listed under material numbers 1.4401, 1.4404, and 1.4571.

In some embodiments, the support members have at least one vertical strut on the support surface for the cable duct, and may be fastened to the wall via the at least one vertical strut by means of a threaded rod.

The support members are fastened to the wall, for example, via threaded rods that are guided through the vertical struts of the support members. In addition, a second vertical strut for each support member, which extends vertically downwardly away from the support surface of the cable duct and in parallel to a first vertical strut, may be provided in order to anchor the threaded rod by nuts on the outer sides of the first and second vertical struts. The thread of the threaded rod is screwed into the wall. For tunnel walls made of concrete, a brass dowel that is inserted into a hole in the tunnel wall is typically used to accommodate the thread.

In some embodiments, the closed cable duct is closed at the top by means of a cover. The closed cable duct includes a U-shaped cable tray and a cover mounted thereon. The flat cable, the branching box, and the lamps are situated within the U-shaped cable tray, as likewise are the mounting holes for the lamps.

In some embodiments, the cover in the mounted state together with the U-shaped cable tray forms a labyrinth seal of the cable duct. A labyrinth seal is understood to mean any form of seal that seals off the escape of gases or liquids by increasing the flow path of the gas or the liquid from a vessel (in the present case, the cable duct or the U-shaped rail together with the cover, which form the vessel). The cover, the same as the other components of the closed cable duct, is made of fireproof stainless steel, for example V2A or V4A.

In some embodiments, the flat cable and/or the branching box include(s) a material which, when combusted, produces a gas that is suitable for suppressing development of a fire, the gas being held within the closed cable duct by the closed-off design of the closed cable duct.

The housing of the branching box or of the flat cable may include, for example, polypropylene (PP), polyethylene (PE), or other thermoplastic polymers. The combustion of PE or PP results in essentially carbon dioxide and water; carbon dioxide is suitable as a fire retardation gas in the above sense, due to the fact that it displaces atmospheric oxygen from the cable duct and thus withdraws the essential ingredient for development of a fire.

By using such materials in the closed cable duct, or by just providing a closed cable duct over a flat cable that already contains a material that releases carbon dioxide during combustion, development of a fire in the area of the cable duct may be delayed by up to 10 minutes. The power supply to the emergency lighting of the handrail installation thus remains functional for a longer period of time, so that lives may be saved.

In some embodiments, an emergency switch is provided which is connected to the handrail installation with emergency lighting, and via which the emergency lighting may be activated. This emergency switch may be actuated, for example, by train personnel in a train that is involved in an accident in a railway tunnel in order to activate the emergency lighting for the handrail. These emergency switches themselves are typically permanently lighted so that the switch can be easily found, even in the darkness of a tunnel.

Activating the emergency lighting of the handrail installation only in an actual emergency on the one hand saves energy and on the other hand increases the service life of the system, since the lamps of the emergency lighting are activated only in a critical situation, and thus do not prematurely age due to continuous illumination of the handrail system.

The handrail installation with emergency lighting extends, for example, over the entire length of a tunnel, and for crossways, tunnel pillars, and edges in the course of the tunnel is guided around bends, corners, and/or edges of the tunnel wall.

The handrail installation with emergency lighting does not have to lead to the end of the tunnel; rather, it is sufficient for it to extend to the nearest rescue tunnel of a tunnel. However, if a certain crossway is to be controlled, or if the handrail installation with emergency lighting is to extend to the end of the tunnel, it is necessary to bypass tunnel pillars or crossways, located in between, that protrude from the tunnel wall.

For this purpose, the handrail installation with emergency lighting must be guided around bends of up to 90° or around corners (abrupt bend by 90°). This is achieved by supplementing the support members with angled parts that guide the handrail installation with emergency lighting around the bend or corner. In addition, the closed cable duct and the handrail in terms of structure must be adapted to the corner or bend, for example by using corner parts.

In some embodiments, the handrail is fixed to the support surfaces for the handrail of the support members by screws, and the cable duct is fixed to the support surfaces for the cable duct of the support members by screws. In this way, both components are secured from slipping out of their guides. In particular, a handrail designed as a plastic tube could otherwise be easily pulled down by passengers in a state of panic.

A further aspect relates to an installation kit for a handrail installation with emergency lighting, wherein the installation kit includes a handrail with emergency lighting, a closed cable duct, a flat cable for installation in the closed cable duct in its longitudinal direction, and multiple branching boxes for contacting the flat cable without stripping of insulation, wherein the cable duct is also provided for accommodating the branching boxes, and includes discrete support members having support surfaces, that are different from one another, for the handrail and the cable duct. The handrail forms a component that is separate from the cable duct, and is designed for arrangement above the closed cable duct. The installation kit for a handrail installation with emergency lighting also includes multiple lamps for arrangement in succession in the longitudinal direction of the handrail installation, wherein openings for passing through the lamps for radiation away from the cable duct floor are provided in the floor of the cable duct, and wherein the closed cable duct and the support members are made of metal.

The drawings and the description of the drawings refer to examples of the invention, and not to the invention itself.

DESCRIPTION OF EXEMPLARY EMBODIMENTS WITH REFERENCE TO THE DRAWINGS

Figure 1:
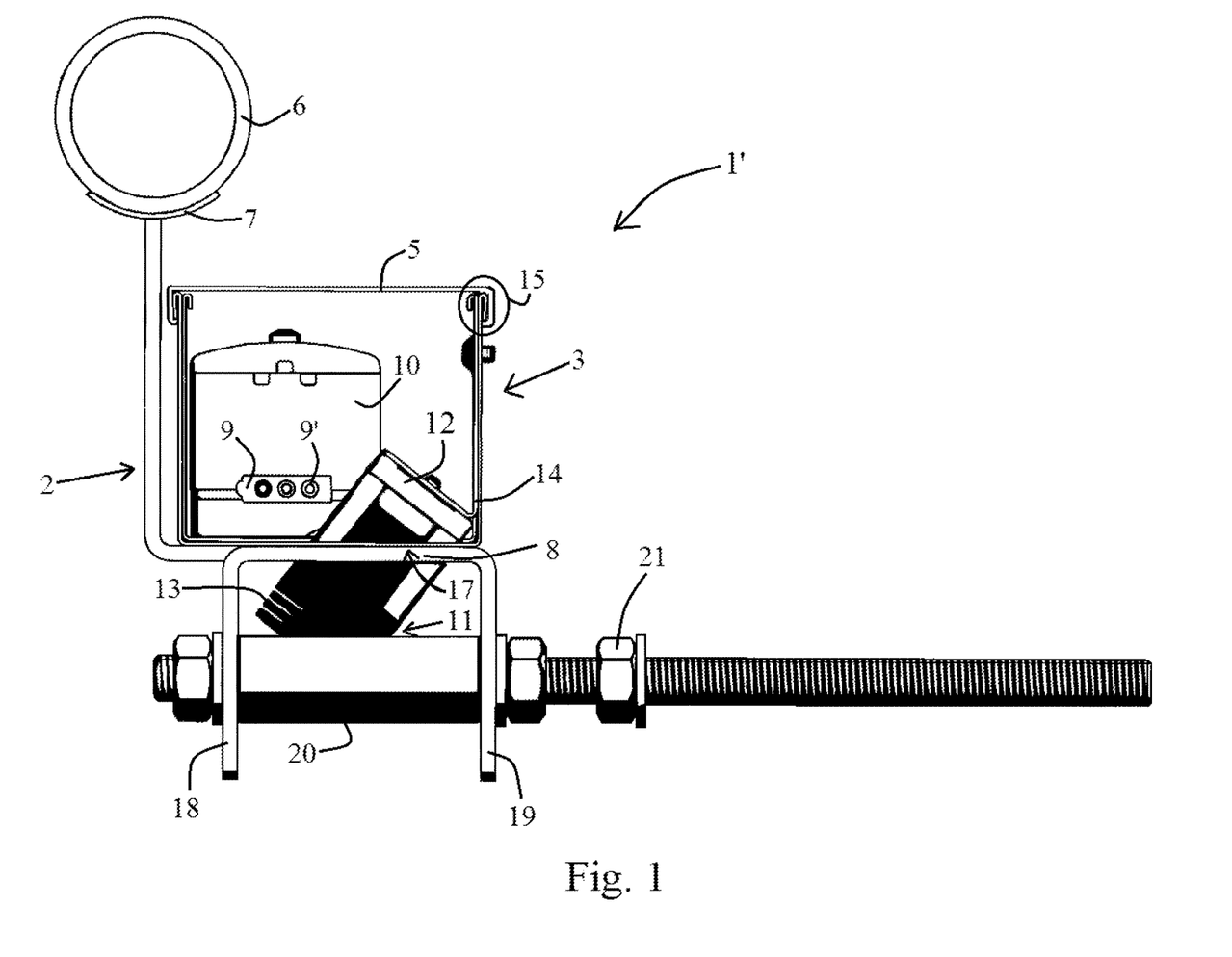
FIG. 1 shows a side sectional view of the handrail installation with emergency lighting, with lamps passed through obliquely downwardly.

The handrail installation with emergency lighting 1 according to FIG. 1 includes as main components multiple support members 2, a closed cable duct 3, a flat cable 9 that extends along the closed cable duct 3, multiple branching boxes 10 that contact the flat cable 9, multiple lamps 11 that are installed in the closed cable duct 3, and lastly, the handrail 6. The handrail installation with emergency lighting 1 is shown in FIG. 1 in a cross section through a location at which the closed cable duct 3 rests on a support member 2.

The closed cable duct 3 is formed by a U-shaped cable tray 4 and a cover 5 mounted thereon. The upper ends of the U-shaped cable tray 4 on which the cover 5 is mounted, and the cover 5 itself, are designed in such a way that they form a labyrinth seal 15 of the cable duct. As a result of the labyrinth seal 15, the flow path for gases escaping from the cable duct is increased so greatly that a sealing effect with respect to these gases results.

The cable duct is situated at the top side of multiple support members 2, on a support surface for the cable duct 8 that is formed on these support members. The support members 2 have a side wall 22 that holds the closed cable duct 3 in a position between the tunnel wall and the side walls 22 of the support members. The support members 2 themselves are fastened to the tunnel wall via two vertical struts 18, 19 in each case and a threaded rod 20 that is fixed via nuts 21.

The side walls 22 of the support members on their top side have a support surface 7 for the handrail, via which the handrail 6 is guided along the tunnel wall. The handrail 6 is designed as a tube made of glass fiber-reinforced plastic.

The cores 9' of the flat cable 9 extending in the closed cable duct 3 are contacted, without stripping of insulation, by the branching boxes 10 situated in the cable duct 3. This takes place, for example, via contact blades (not illustrated) inside the branching boxes 10. The branching boxes 10 establish an electrical connection between the power-supplying flat cable 9 and the emergency lighting, provided by the lamps 11. The emergency lighting, the handrail 6, and the flat cable 9 extend in the horizontal direction along the tunnel wall, either along the entire tunnel, or away from a given starting point at least up to a rescue tunnel or the like.

The emergency lighting is formed by lamps 11. The lamps 11 are provided every 0.8 to 2 meters. The lamps 11 in the embodiment according to FIG. 1 are connected directly to the branching box 10, and therefore are directly placed on same. The lamps 11 are inserted into lamp housings 12, which are mounted in the closed cable duct 3 via suspensions 14. The lamps 11 are guided obliquely through installation openings in the floor of the cable duct 17, so that they illuminate the area obliquely below the closed cable duct 3 and the support member 2. The actual lighting means of the lamps 11 are LEDs 13, which are placed at the tip of the lamp that is guided through the installation opening 17. The lamps 11 themselves are thus installed within the cable duct via the lamp housing 12, while the LEDs 13 at the tips of the lamps 11 are already situated outside the cable duct.

The compact arrangement of branching boxes 10 together with lamps 11 connected thereto directly in the closed cable duct 3, in positions that are specified by installation openings for the lamps 17, allows particularly simple installation of the lamps 11. In particular, the position of the lamps is fixed by the installation openings 17, and it is not necessary to lay long connecting lines between the branching box 10 and the lamp 11.

The branching box 10 and the flat cable 9 are designed for functional integrity in the event of fire. The flat cable 9 has ceramifying core insulation, while electrically conductive parts in the branching box 10 are kept electrically insulated from one another by ceramic parts, even in the event of fire. In contrast, the lamps 11 do not have a fireproof design; however, the electrical connection between the lamps and the branching box is protected by one fuse per lamp or one fuse for 10 to 20 lamps, which is/are triggerable by temperatures typical for fire and/or by overcurrent.

The outer shell of the flat cable 9 and the housing of the branching box 10 are made of a plastic that in the event of fire releases carbon dioxide, which functions as a type of protective gas within the closed cable duct 3. The carbon dioxide displaces oxygen, and there is little or no escape of carbon dioxide itself from the closed cable duct 3. As a result, spreading of the fire to the lamp, the flat cable, and the branching box may be delayed.

The closed-off cable duct (i.e., the cable tray and cover) as well as the support members 2 and the threaded rod 20 and nuts 21 are made of fireproof stainless steel of quality class V2A or V4A, so that they ensure resistance to a fire having temperatures of up to 900° C.

The lamp housing 12, the lamps 11, and the branching boxes are provided with a plastic outer shell, and rubber seals at their openings. Thus, they meet the requirements for up to IP68 for protection from penetration of dust and water.

Figure 2:
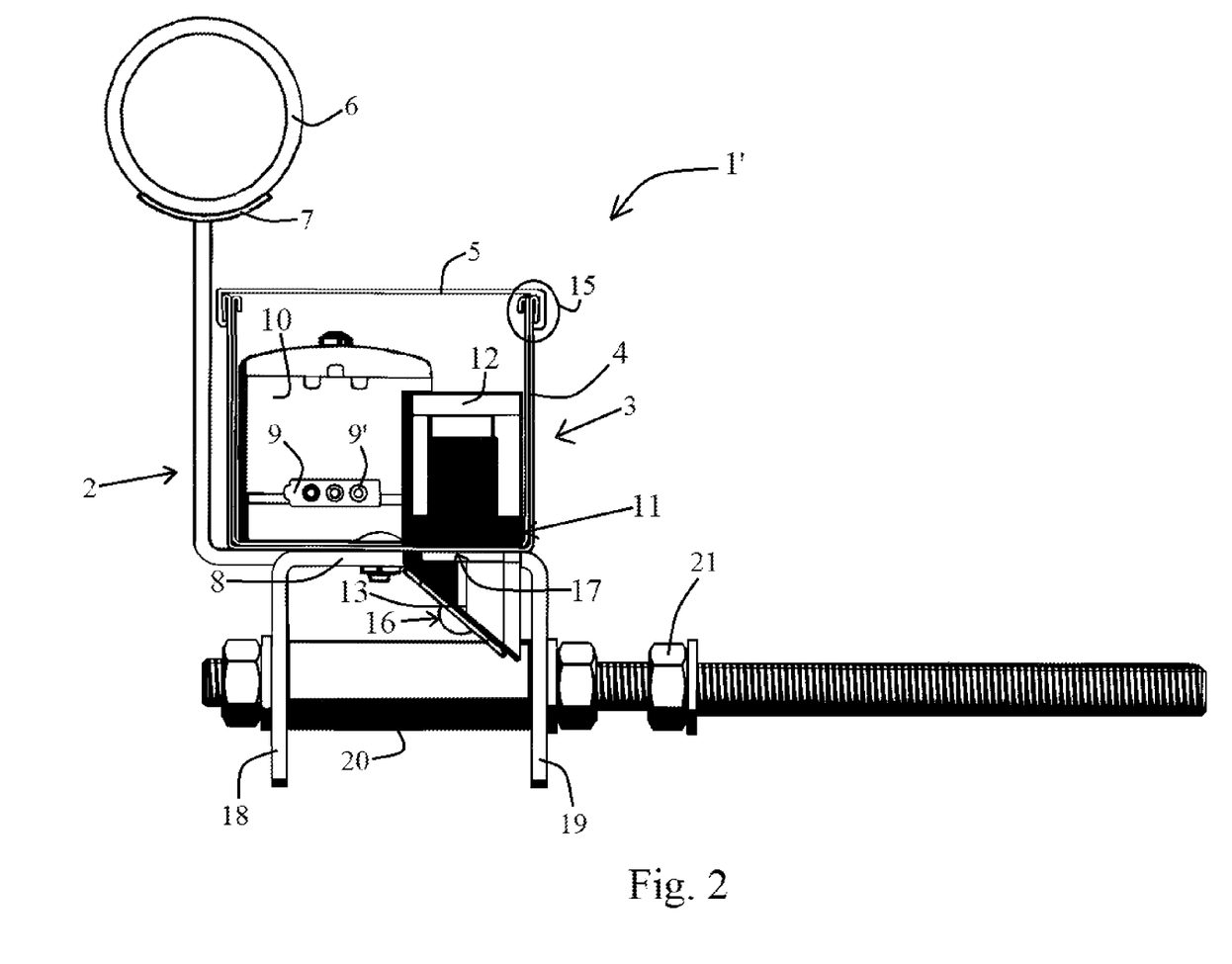
FIG. 2 shows a side sectional view of the handrail installation with emergency lighting, with lamps passed through straight down, and a lens for deflecting the light in the oblique downward direction.

The handrail installation with emergency lighting 1', shown in FIG. 2 in a cross section comparable to that in FIG. 1, essentially corresponds to the handrail installation with emergency lighting from FIG. 1.

The difference from the embodiment illustrated in FIG. 1 is that the lamps 11 and the lamp housing 12 in the closed cable duct 3 are oriented vertically downwardly, not obliquely downwardly as in FIG. 1. Likewise, the lamps 11 are not guided obliquely downwardly through the installation opening in the floor of the closed cable duct 3, but instead are oriented straight down (in the direction of the tunnel floor).

However, the LEDs 13 situated at the tip of the lamps 11 still illuminate the area laterally below the closed cable duct 3 and the support members 2. This is achieved by deflecting the light of the LEDs 13 in this direction via lenses 16.

Figure 3:
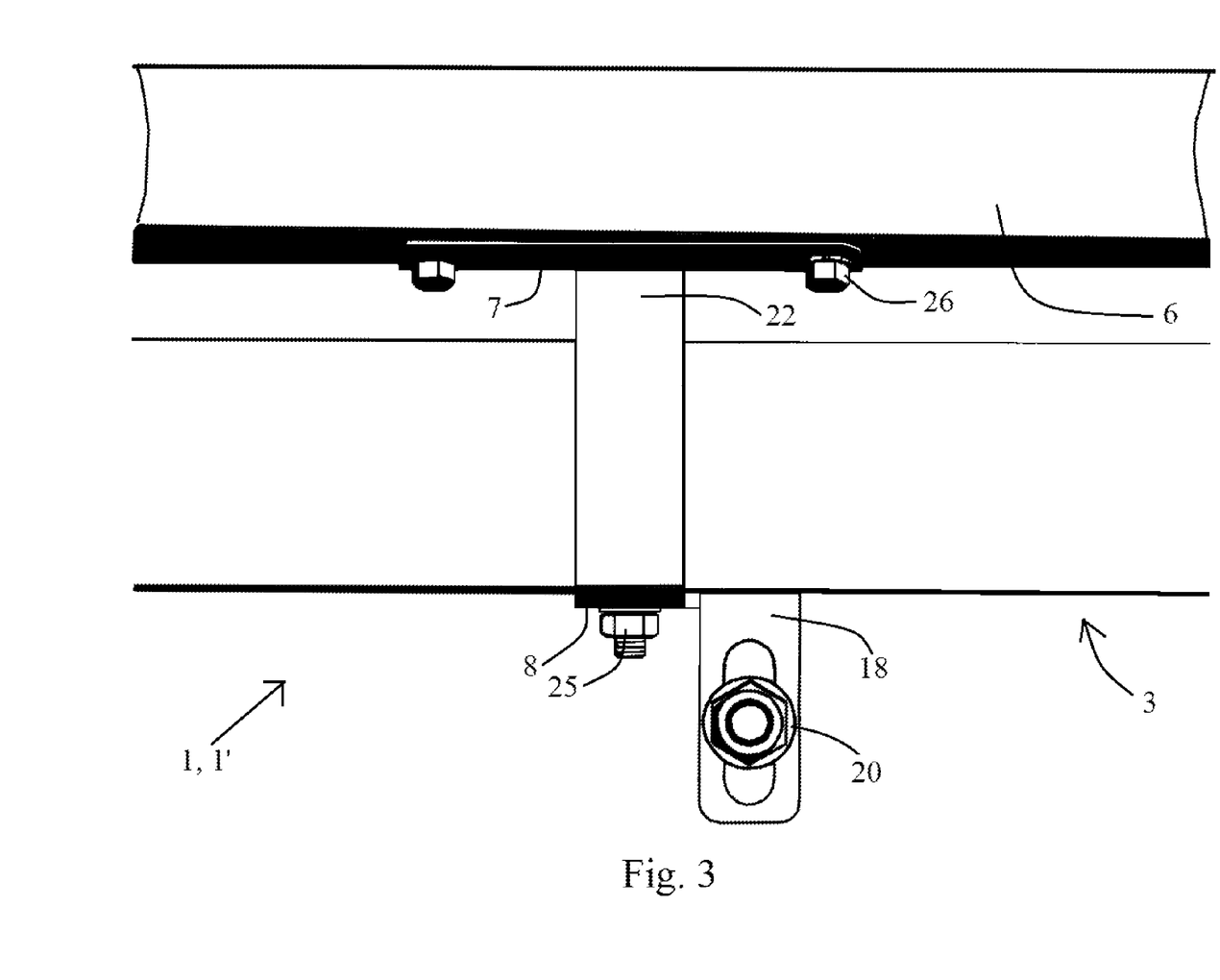
FIG. 3 shows a schematic side view of the handrail installation with emergency lighting.

The handrail installation with emergency lighting is illustrated in FIG. 3 in a side view from the tunnel center. The handrail 6 is fastened to a support surface 7 for the handrail by means of screws. The support surface for the handrail adjoins the side wall 22 of the illustrated support member. The closed cable duct 3 once again rests on the support surface for the cable duct 8, and is secured against slipping in the direction toward the tunnel center by the side wall 22 of the support member. The support member 2 itself is once again fastened in the wall via the threaded rod 20 that is fixed by nuts 21. FIG. 3 shows a perspective view only of the location at which the threaded rod is guided through the first vertical strut 18, situated farther in the direction tunnel center, of the support member 2. As indicated by the vertical arrows, the vertical position of the threaded rod, and thus the installation height of the handrail installation with emergency lighting 1, 1' may be adjusted.

The handrail 6 is fixed to the support surface for the handrail 7 by screws 26 so that it cannot slip. Likewise, the cable duct is fixed to the support surface for the cable duct 8 by means of a screw 25.

Figure 4:
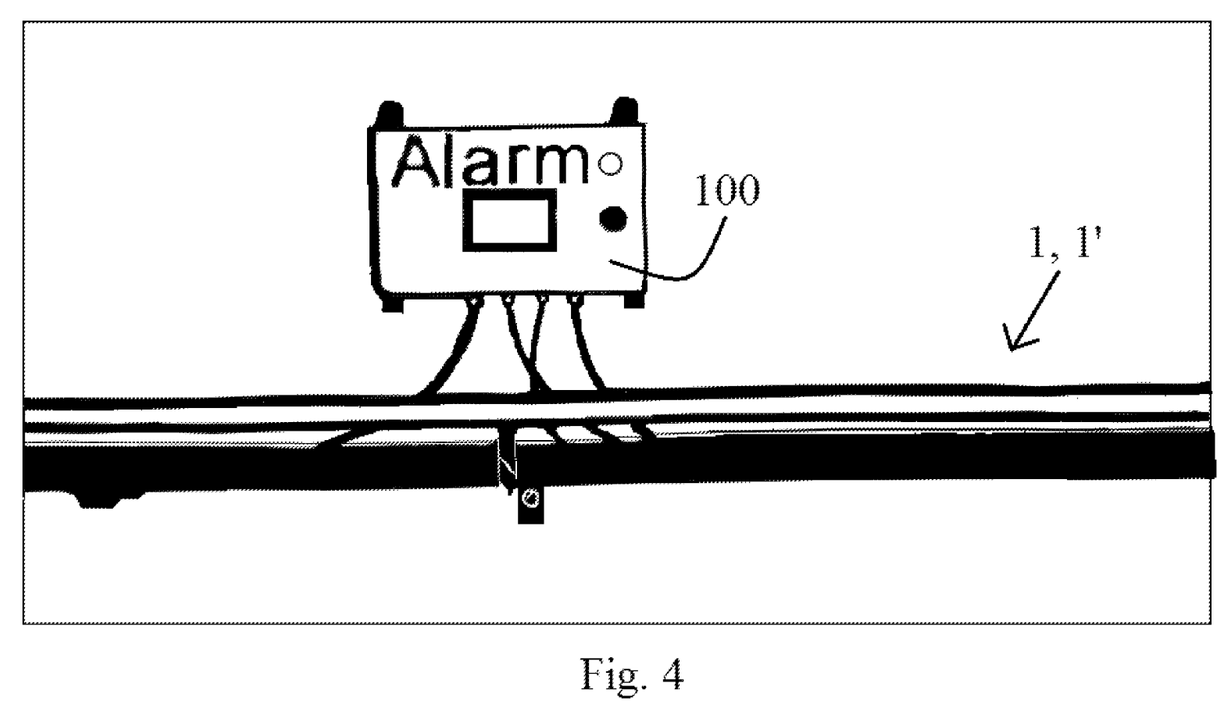
FIG. 4 shows a side view of the handrail installation with emergency lighting, with an emergency switch connected thereto.

An emergency switch 100 is connected to the handrail installation with emergency lighting 1, 1', as illustrated in FIG. 4. The emergency lighting is activated when the emergency switch 100 is actuated, for example by train personnel or personnel of some other vehicle that is traveling through the tunnel. The space laterally next to the handrail 6 and below the handrail 6 is then linearly illuminated by the lamps 11 of the emergency lighting, so that passengers may be brought to safety along the handrail 6.

Figure 5:
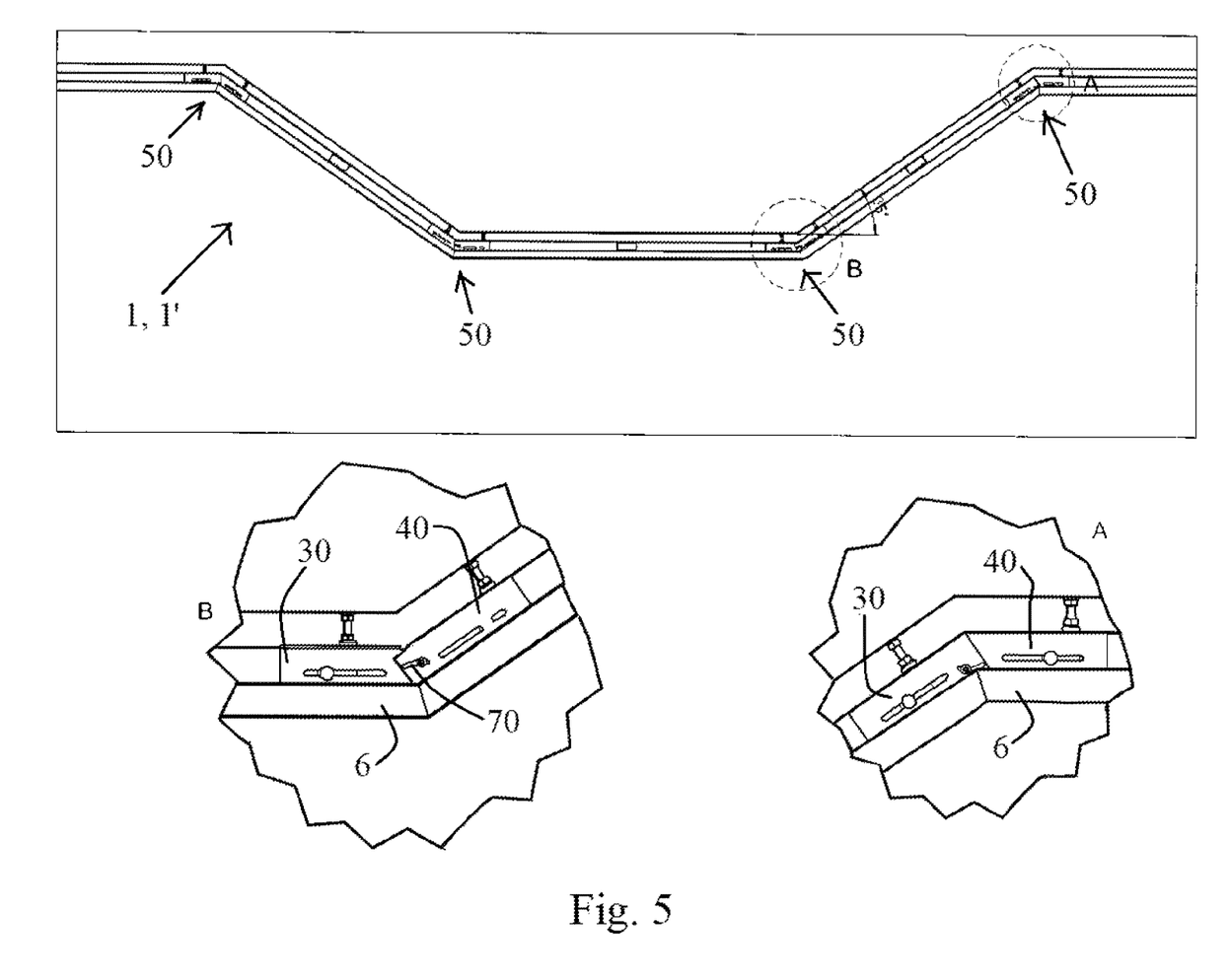
FIG. 5 shows a schematic illustration of a handrail installation with emergency lighting that is guided around two bends.

A handrail installation with emergency lighting 1, 1' that is guided around four edges 50 of a tunnel is schematically illustrated in FIG. 5. The support members 2 at the corners are replaced by angled parts 30, 40 which bear the respective corner parts of the cable duct 3 and the handrail 6. The angled parts 30, 40 are designed in such a way that an angled part 30 may snap into an adjustment rail 70 of a second angled part 40 in various positions. The angled parts 30, 40 may thus be situated at various angles relative to one another, and thus used for bridging various tunnel edges with various angles of inclination.

In addition, an installation kit for a handrail installation with emergency lighting is provided. Such an installation kit is a combination of various parts to build an installation having functional integrity in the event of fire, the parts being coordinated with one another with regard to function, material selection, and dimensions in such a way that they allow adjustment of an installation of the stated type. Such a kit made up of parts is present, for example, at a construction site before the actual installation work can begin. The installation kit for a handrail installation includes a handrail 6, a closed cable duct 3, and a flat cable 9 as described in conjunction with FIGS. 1 and 2, for example. The installation kit also includes multiple branching boxes 10 for contacting the flat cable, wherein the cable duct is also provided for accommodating the branching boxes. The installation kit also includes discrete support members 2 having support surfaces, that are different from one another, for the handrail 6 and the cable duct 3, wherein the handrail 6 forms a component that is separate from the cable duct 3 and is designed for arrangement above the closed cable duct 3. This is also illustrated in FIGS. 1 and 2. The installation kit also includes multiple lamps 11 for arrangement in succession in the longitudinal direction of the handrail installation with emergency lighting 1, 1', wherein openings 17 for passing through the lamps 11 for radiation away from the cable duct floor are provided in the floor of the cable duct 3. The closed cable duct 3 and the support members 2 are made of metal, as described above.

The illustration is only an example; for example, larger or smaller quantities of individual parts may be provided, or some parts may be omitted altogether.

The invention claimed is:
1. A handrail installation with emergency lighting for tunnels, comprising:
   a handrail,
   a closed cable duct,
   a flat cable that is installed in the closed cable duct, and multiple branching boxes for contacting the flat cable without stripping of insulation, wherein the branching boxes contact the flat cable within the closed cable duct, wherein the handrail and the cable duct rest on support surfaces on the top side of multiple support members, which are different from one another, and the handrail is provided separately from the closed cable duct and the support members, and the cable duct is provided separately from the support members, and wherein the handrail is situated above the closed cable duct, wherein the emergency lighting includes multiple lamps situated in succession, which are placed at the branching boxes and are supplied with power by the branching boxes, wherein the lamps are passed through installation openings in the floor of the cable duct, in the direction of the tunnel floor, so that the lamps radiate into an area below the closed cable duct, wherein the handrail and the cable duct are horizontally guided along a tunnel wall by the support members, wherein the closed cable duct and the support members are made of metal.

2. The handrail installation according to claim 1, wherein the flat cable as well as the branching boxes have a fireproof design.

3. A handrail installation with emergency lighting according to claim 1, wherein the branching boxes are protected from penetration of dust or water by a plastic housing and seals on the openings, and wherein the lamps, individually or in groups, are protected against overcurrent and/or temperatures typical for fire.

4. The handrail installation with emergency lighting according to claim 1, wherein the lamps are inserted into a lamp housing and include a lighting means, wherein the lamp housing is made of a water-tight material and the lamp is protected from penetration of dust or water.

5. The handrail installation with emergency lighting according to claim 4, wherein the lighting means are oriented either obliquely downwardly, or vertically downwardly with the light emitted by the lighting means being deflected in the obliquely downward direction by a deflection device.

6. The handrail installation with emergency lighting according to claim 1, wherein the lamps are designed in such a way that they linearly illuminate the area below the cable duct and handrail.

7. The handrail installation with emergency lighting according to claim 6, wherein the distance between two lamps of the emergency lighting is between 0.8 and 2 meters.

8. The handrail installation with emergency lighting according to claim 1, wherein the support members and the cable duct are made of solid V2A or V24 stainless steel.

9. The handrail installation with emergency lighting according to claim 1, wherein the support members have at least one vertical strut on the support surface for the cable duct, and are able to be fastened to the wall via the at least one vertical strut by means of a threaded rod.

10. The handrail installation with emergency lighting according to claim 1, wherein the closed cable duct is closed at the top by means of a cover, wherein the closed cable duct includes a U-shaped cable tray and a cover mounted thereon.

11. The handrail installation with emergency lighting according to claim 10, wherein the cover in the mounted state together with the U-shaped cable tray forms a labyrinth seal of the cable duct.

12. The handrail installation with emergency lighting according to claim 1, wherein the flat cable and/or the branching box include(s) a material which, when combusted, produces a gas that is suitable for suppressing development of a fire, the gas being held within the closed cable duct by the closed-off design of the closed cable duct.

13. The handrail installation with emergency lighting according to claim 1, wherein an emergency switch is provided which is connected to the handrail installation with emergency lighting, and via which the emergency lighting are able to be activated, and wherein the handrail installation with emergency lighting extends over the entire length of a tunnel, and for crossways, tunnel pillars, and edges in the course of the tunnel is guided around bends, corners, and/or edges of the tunnel wall.

14. The handrail installation with emergency lighting according to claim 1, wherein the handrail is fixed to the support surfaces for the handrail of the support members by screws, and wherein the cable duct is fixed to the support surfaces for the cable duct of the support members by screws.

15. An installation kit for a handrail installation with emergency lighting according to claim 1, wherein the installation kit comprises the following:
a handrail,
a closed cable duct,
a flat cable for installation in the closed cable duct in its longitudinal direction,
multiple branching boxes for contacting the flat cable without stripping of insulation,
wherein the cable duct is also provided for accommodating the branching boxes;
discrete support members having support surfaces, that are different from one another, for the handrail and the cable duct,
wherein the handrail forms a component that is separate from the cable duct, and is designed for arrangement above the closed cable duct,
multiple lamps for arrangement in succession in the longitudinal direction of the handrail installation,
wherein openings for passing through the lamps for radiation away from the cable duct floor are provided in the floor of the cable duct,
wherein the closed cable duct and the support members are made of metal.

* * * * *